United States Patent
Yokokawa

(10) Patent No.: US 7,895,010 B2
(45) Date of Patent: Feb. 22, 2011

(54) RESOLVER ANGLE DETECTION DEVICE AND METHOD OF DETECTING POSITION WITH A RESOLVER

(75) Inventor: Narutoshi Yokokawa, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 101 days.

(21) Appl. No.: 12/341,237

(22) Filed: Dec. 22, 2008

(65) Prior Publication Data

US 2009/0167296 A1 Jul. 2, 2009

(30) Foreign Application Priority Data

Dec. 28, 2007 (JP) .................. P2007-338940

(51) Int. Cl.
*G01B 7/30* (2006.01)
*G06F 19/00* (2006.01)
(52) U.S. Cl. ...................... 702/104; 702/151
(58) Field of Classification Search ................ 702/104, 702/151
See application file for complete search history.

(56) References Cited

U.S. PATENT DOCUMENTS

2002/0173931 A1* 11/2002 Dudler et al. ............... 702/151
2005/0033539 A1* 2/2005 Ishizuka et al. .............. 702/94
2005/0127280 A1* 6/2005 Ura .......................... 250/231.13
2005/0273295 A1* 12/2005 Ito ............................ 702/151
2008/0172202 A1* 7/2008 Nakazato ................... 702/151

FOREIGN PATENT DOCUMENTS

JP 11-118520 4/1999

OTHER PUBLICATIONS

English Language translation of JP-11-118520, JP11-118520 publication date is Apr. 30, 1999.
Office Action issued in German Appl. 102008063089.6 on Sep. 17, 2010.
English Language Translation of Office Action issued in German Appl. 102008063089.6 on Sep. 17, 2010.

* cited by examiner

*Primary Examiner*—Cindy H Khuu
(74) *Attorney, Agent, or Firm*—DLA Piper LLP US

(57) ABSTRACT

A resolver apparatus having a high detection precision detecting angle signals from signals detected at a resolver (7) and detecting a velocity signal from the detected angle signals. Utilizing the fact that an error waveform of a resolver is comprised of predetermined n-th order components inherent to the resolver and has reproducibility, an angle error estimator (13) applies a frequency transform, for example, a Fourier transform, to high frequency components of velocity signal including error generated from detected angle signals including error to calculate a magnitude of error for each of a plurality of divided components and combining the calculated errors to reproduce the detected error and generate an error waveform signal. An angle signal correction circuit (14) uses this error waveform signal to correct an angle signal including error detected at the resolver.

4 Claims, 13 Drawing Sheets

RELATED ART

US 7,895,010 B2

RESOLVER ANGLE DETECTION DEVICE AND METHOD OF DETECTING POSITION WITH A RESOLVER

CROSS REFERENCES TO RELATED APPLICATIONS

The present invention contains subject matter related to Japanese Patent Application No. 2007-338940 filed in the Japan Patent Office on Dec. 28, 2007, the entire contents of which being incorporated herein by reference.

BACKGROUND OF THE INVENTION

1. Field of the Invention

The present invention relates to a resolver apparatus and an angle detection device and method of the same. More specifically, the present invention relates to an angle detection device and method of a resolver raising the detection precision and a resolver apparatus having the angle detection device and a resolver.

2. Description of the Related Art

FIG. 1 is a view of the configuration of a resolver body 7. The resolver body 7 is provided with a SIN winding 4, a COS winding 5 arranged mechanically offset by 90 degrees from this SIN winding 4, and a rotor winding 6. An object of detection of the rotational angle (or rotational position), for example, a shaft of a motor (not shown), is connected to the rotor winding 6. As the resolver, a two-phase excitation single-output system and a single-phase excitation two-output system are known. Below, for example, the two-phase excitation single-output system will be illustrated. A SIN winding voltage and a COS winding voltage are supplied to the SIN winding 4 and the COS winding 5, whereby a signal corresponding to the rotational angle of the object for which the rotational angle is being detected is detected from the rotor winding 6. Namely, when the object for which the rotational angle is being detected rotates, the rotor winding 6 rotates and a linkage flux state of the SIN winding 4 and the COS winding 5 changes. By extracting and processing that state from the rotor winding 6 as a rotor winding voltage S6, the rotational angle or rotational position of the object for which the rotational angle is being detected can be detected.

A resolver has the advantage that it is mechanically durable and can withstand even deleterious environments, therefore is being utilized for detection of various rotational angles (or rotational positions). However, a resolver has the defect that the detection error is large and the detection precision is low when compared with an encoder used for the detection of a rotational angle of a servo motor etc. For this reason, the practice has been to correct the detection error.

FIG. 2 is a graph showing an example of the detection error of the resolver. The abscissa shows the actual angle, and the ordinate shows the detection angle. A line CV1 indicates the actual accurate angle having no error, while a curve CV2 fluctuating above and below the line CV1 indicates a detection angle including detection error. The detection error of the resolver is determined in magnitude and direction of error with respect to the angle as illustrated in FIG. 2. Although there is reproducibility, there are large individual differences in the resolvers concerning the detection error. The waveform of the detection error illustrated by the curve CV2 also differs for each resolver. Accordingly, the practice had also been to perform processing for correcting detection error so as to raise the detection precision for individual resolvers as well.

FIG. 3 is a diagram showing the circuit configuration of a conventional estimated angle generation circuit 14A. The estimated angle generation circuit 14A has a table number acquisition portion 35, an error angle data reference portion 38, and a subtraction portion 37. The error angle data reference portion 38 has a ROM 38a. For example, in advance, as illustrated in FIG. 2, actual angles and detection angles are found, the detection errors are detected (calculated), and waveform signals of the detected errors are stored as a table in the ROM 38a. When actually correcting detection error to calculate an angle, the table number acquisition portion 35 generates an address signal S35 for reading out a waveform signal of error stored in the ROM 38a based on the angle detection signal S11 detected from the rotor winding of the resolver, and the error angle data reference portion 38 reads out the corresponding error angle data S36 from the ROM 38a based on the address signal S35. Further, the subtraction portion 37 subtracts the error angle data S36 from the angle detection signal S11 to correct the angle detection signal S11. The angle corrected in this way is utilized as, for example, an angle detection signal of a position feedback control system or speed feedback system.

As another method of correcting the detection error of a resolver, for example, Japanese Patent Publication (A) No. 11-118520 discloses, as a prior art for a resolver apparatus of the single-phase excitation two-output system, a method of calculating the angle by a tracking system using an analog circuit and, for improving this method using an analog circuit, a method of detecting the angle by digital signal processing using a Fourier transform.

The Fourier transform method for the latter resolver of the single-phase excitation two-output system will be explained next. Processing for inputting an (S-sin) signal, an (S-cos) signal, and an excitation signal (sin ωt) of the single-phase excitation two-output system resolver and converting them by A/D conversion, multiplying the A/D converted (S-sin) signal and (S-cos) signal in a digital manner to find a multiplication result SA1, and multiplying the A/D converted excitation signal (sin ωt) by cos ωt to find a multiplication result SB1 is repeated by exactly the number of times of the sampling number $\underline{n}$. In the same way, the cos signal is multiplied with sin ωt to find the multiplication results CA2 and CB2. An absolute value of sin θ is found from absolute values of SA1 and SB1, an absolute value of cos θ is found from absolute values of CA2 and CB2, a tan⁻θ of sin θ and cos θ is found, and a digital angle θ is found from a tan⁻ table.

The method explained with reference to FIG. 3 has the problem that the processing for detecting detection errors from the relationships between accurate actual angles and detection angles including detection error in advance for each of the resolvers, organizing the results, and storing the same, for example, as a table linking the actual angles and detection angles as illustrated in FIG. 2 in, for example, the ROM 38a of the error angle data reference portion 38 illustrated in FIG. 3 must be carried out manually, so is very troublesome. In particular, in actual use, there is the restriction that the resolvers and angle detection devices must be in one-to-one correspondence. The above work must be carried out for individual resolvers by using such angle detection devices, so there is an inconvenience that this technique is not suited for application to general purpose servo motors and servo amplifiers.

If determining a correction value of detection error for each resolver each time, for example, a large inertia is attached to the servo motor, a rotation inertia of that inertia is utilized to realize a constant rotation with no pulsation, actual angles and detection angles are measured at that constant rotation to detect detection errors included in the detection angles, and the detected detection errors are analyzed and stored as a table linking actual angles and detection angles in a memory of a computer. Using the above method, detection error is actually corrected for the detection angle. Measurement of the detection error from the actual angle and the detected angle in a state where there is no fluctuation of the rotation by using inertia is advantageous for improving the precision of the correction. However, the motor measured for rotational position for example often rotates when the power is turned on in a state where it is attached to a robot or conveyer. In practice, attachment of such inertia to a motor etc. is often difficult.

Japanese Patent Publication (A) No. 11-118520 discloses only a Fourier transform method using signal processing by a computer by software. In the signal processing by software, however, too long a processing time is taken for performing various complex processing such as Fourier transforms, so it is not possible to detect the angle of an object for angle detection in real time. Accordingly, for example, this cannot be applied to applications for quickly detecting the rotational angle of a rotating body rotating at a high speed, for example, a motor.

While not disclosed nor suggested in Japanese Patent Publication (A) No. 11-118520, even if using a high speed processor, for example, a digital signal processor (DSP), in place of a usual computer to realize faster processing, this method would not be suitable for angular detection in real time. Further, the price of the system would become expensive. Further, the method disclosed in Japanese Patent Publication (A) No. 11-118520 covers a resolver of the single-phase excitation two-output type and uses two detection signals from the resolver, so if applying the method disclosed in Japanese Patent Publication (A) No. 11-118520, the Fourier transform and other signal processing become complex.

From above, it has been desired to provide an angle detection device of a resolver overcoming the issues explained above.

SUMMARY OF THE INVENTION

The present invention provides a method and an apparatus capable of correctly correcting detection errors of individual resolvers and a resolver apparatus using the same.

Correction Method of Detection Error

The basic technical concept of the method of correction of detection error in the angle detection device of a resolver of the present invention will be explained next. FIG. 4 is a graph showing only an error components illustrated in FIG. 2. The abscissa indicates the actual angle, while the ordinate indicates the detection angle including detection error. Detection error in a resolver is caused by the imbalance of windings in the resolver and mutual interference of windings, therefore the components are reproducible and concentrate in limited components of individual resolvers. As the method for extracting such components, the frequency of the detection angle signal is analyzed. For example, for frequency analysis, a Fourier transform is applied.

FIG. 5 is a graph showing an example of results of application of a Fourier transform to detection error components illustrated in FIG. 4. The abscissa indicates a component order, while the ordinate indicates a Fourier transform intensity (spectrum). In this way, since the detection error components inherent in a resolver concentrate at limited components, almost all signal waveforms copied (reproduced) by major order components coincide with actual waveforms of the error of that resolver. From this, the inventors of the present application found that, for example, as illustrated with reference to FIG. 3, rather than storing the waveform signals of error as a table of the ROM 38a or the like, it is possible to store them as coefficients of high frequency components with respect to a basic wave of one rotation of the object for detection of rotational angle. The angle detection device of a resolver of the present invention and the method of same are based on this discovery.

Namely, the present invention utilizes the fact the error waveform of a resolver is comprised of fixed n-th order components inherent to the resolver and has reproducibility. It applies a frequency transform, for example, a Fourier transform, to a velocity signal including error components generated from an angle detection signal including error, preferably the high frequency component of the velocity signal, to calculate the magnitude of the detection error of each of a plurality of components, combines the calculated detection errors to reproduce the detection error included in the detected angle signal, and generate an error waveform signal. Further, it uses this error waveform signal to correct an angle detection signal including detection error.

Note that, in order to make the detection errors converge, it is preferable to multiply a gain with the magnitudes (spectra) of components of the Fourier transform and accumulate the results. Then, sine waves of the converged n-th order components and cosine signals of the n-th order components are added to calculate the error angle data for use as an estimated angle error signal.

According to the present invention realizing the basic concept explained above, there is provided an angle detection device of a resolver including: an angle detector detecting an angle signal of the resolver from among signals detected from the resolver; a velocity detector detecting a rotational velocity signal of the resolver from the angle signal detected at the angle detector; an angle error estimator calculating a detection error for each frequency component by frequency analysis of the rotational velocity signal with reference to the detected angle signal and combining the calculated detection errors to generate an estimated angle error signal; and an angle signal correction circuit correcting a detected angle signal by using the generated estimated angle error signal.

Preferably, the angle error estimator applies a Fourier transform as the frequency analysis.

Preferably, the angle error estimator has a high pass filter portion passing high frequency components among the rotational velocity signals, an m-part angle velocity data preparation portion dividing the high frequency components of the rotational velocity signals passed through the high pass filter portion to a plurality of regions with reference to the detected angle signals, a Fourier transform portion applying a Fourier transform to the m-part angle velocity data generated at the m-part angle velocity data preparation portion, an n-th order coefficient accumulation portion accumulating Fourier transform coefficients of the n-th order components for results of application of the Fourier transform at the Fourier transform portion to calculate n-th order coefficient accumulation value signals, and an m-part error angle data preparation portion combining the n-th order coefficient accumulation value signals calculated at the n-th order coefficient accumulation portion to prepare the estimated angle error signal.

Further preferably, the n-th order coefficient accumulation portion multiplies a gain smaller than the Fourier transform coefficient with the Fourier transform coefficient of each order component and accumulates the multiplied values to calculate the n-th order coefficient accumulation value signals.

Further, according to the present invention, there is provided an angle detection method of a resolver including: a step of detecting an angle signal of the resolver from among signals detected from the resolver; a step of detecting a rotational velocity signal of the resolver from the detected angle signal; a step of calculating a detection error for each frequency component by a frequency analysis of the rotational velocity signal with reference to the detected angle signal and combining the calculated detection errors to generate an estimated angle error signal; and a step of correcting an angle detection signal by using the generated estimated angle error signal.

Further, according to the present invention, there is provided a resolver apparatus comprising a resolver body having an SIN winding, a COS winding, and a rotor winding; an excite voltage application portion applying excite voltages to the SIN winding and the COS winding or applying an excite voltage to the rotor winding; and an angle detection device of the resolver detecting the angle signal of the resolver based on signals detected from the rotor winding or signals detected from the SIN winding and the COS winding, detecting a rotational velocity signal of the resolver from among the detected angle signals, calculating a detection error for each frequency component by frequency analysis of the rotational velocity signal with reference to the detected angle signal, combining the calculated detection errors to generate an estimated angle error signal, and correcting an angle detection signal by using the generated estimated angle error signal.

According to the present invention, by applying frequency analysis, for example, a Fourier transform, detection errors of individual resolvers can be correctly calculated. Then, by correcting the detected angle signal by using the found detection error, a correct angle detection signal can be provided.

Further, according to the present invention, even after the resolver is attached to the object for which the rotational angle is being detected on a site where the resolver and this angle detection device are installed, it is possible to easily correct the detection error of the resolver.

BRIEF DESCRIPTION OF THE DRAWINGS

These and other objects and features of the present invention will become clearer from the following description of the preferred embodiments given with reference to the attached drawings, wherein.

Figure 6:
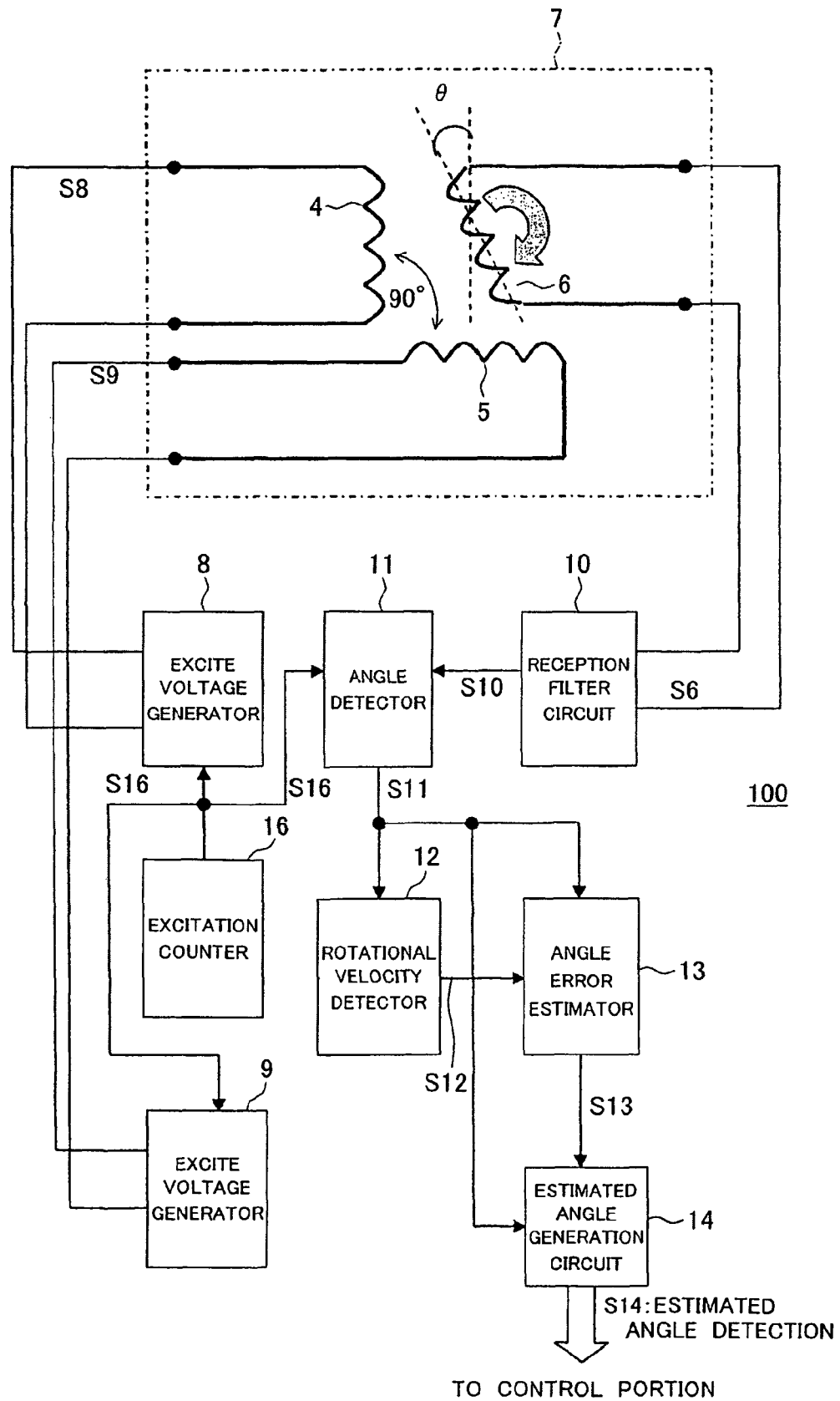
FIG. 6 is a view of the configuration of a resolver and its angle detection device of an embodiment of the present invention.
Figure 8:
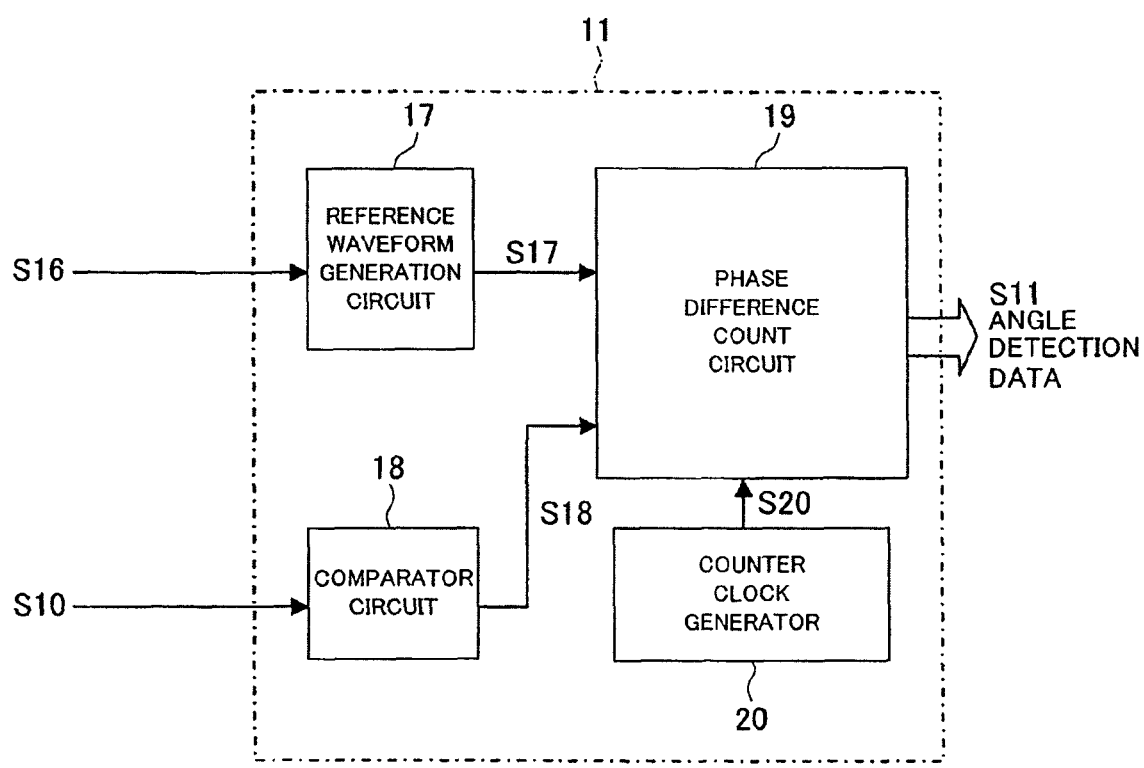
FIG. 8 is a view of the circuit configuration of an angle detector shown in FIG. 4.
Figure 9:
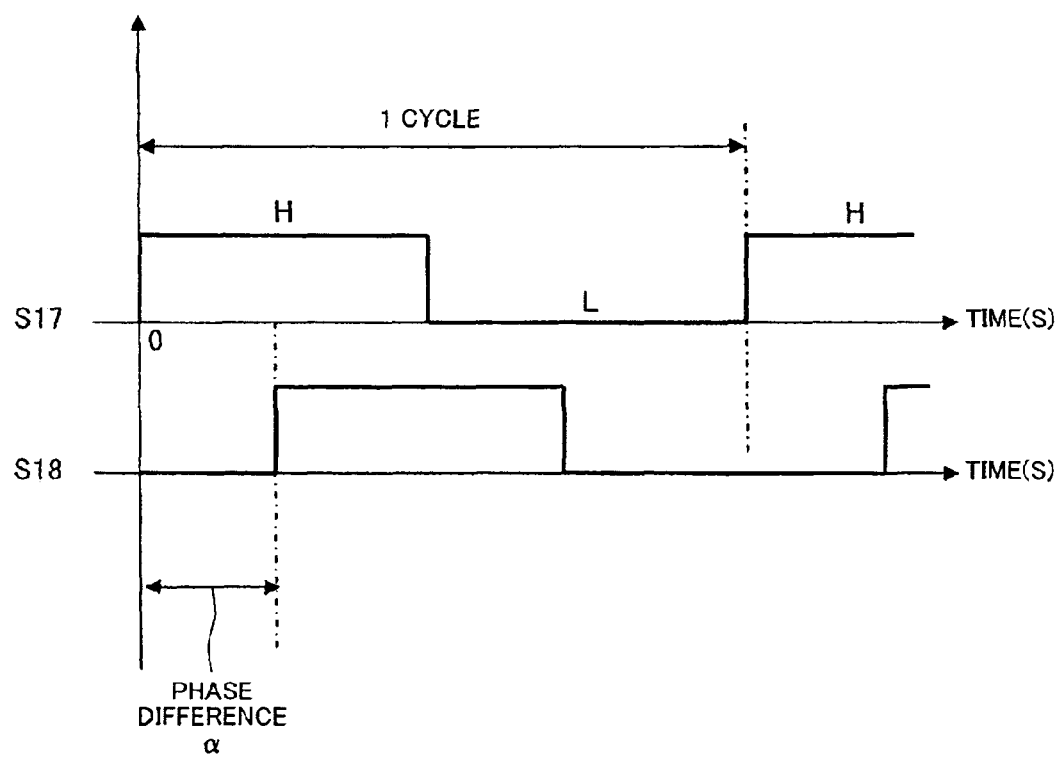
Figure 10:
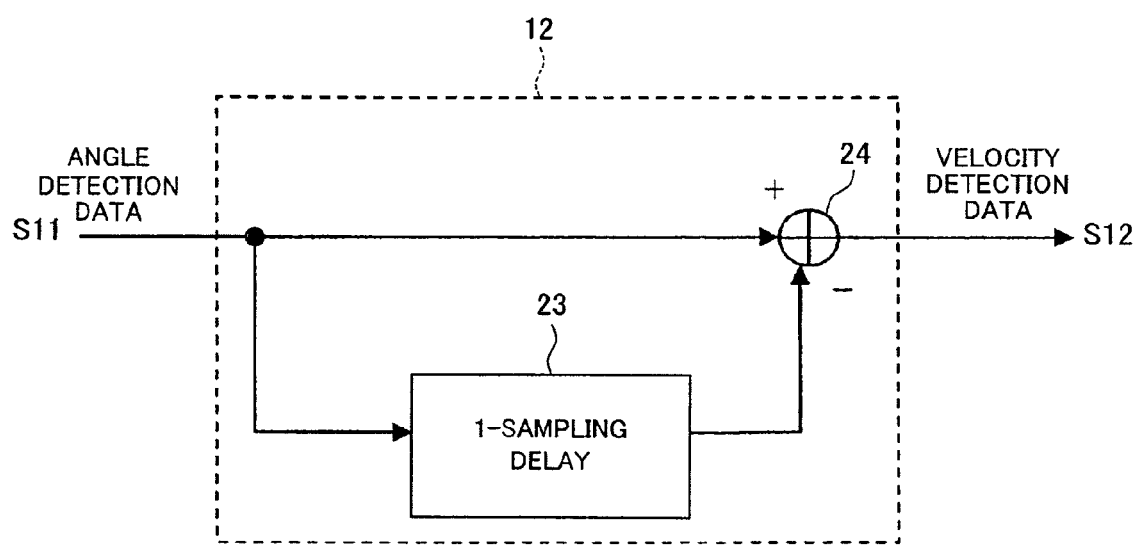
Figure 11:
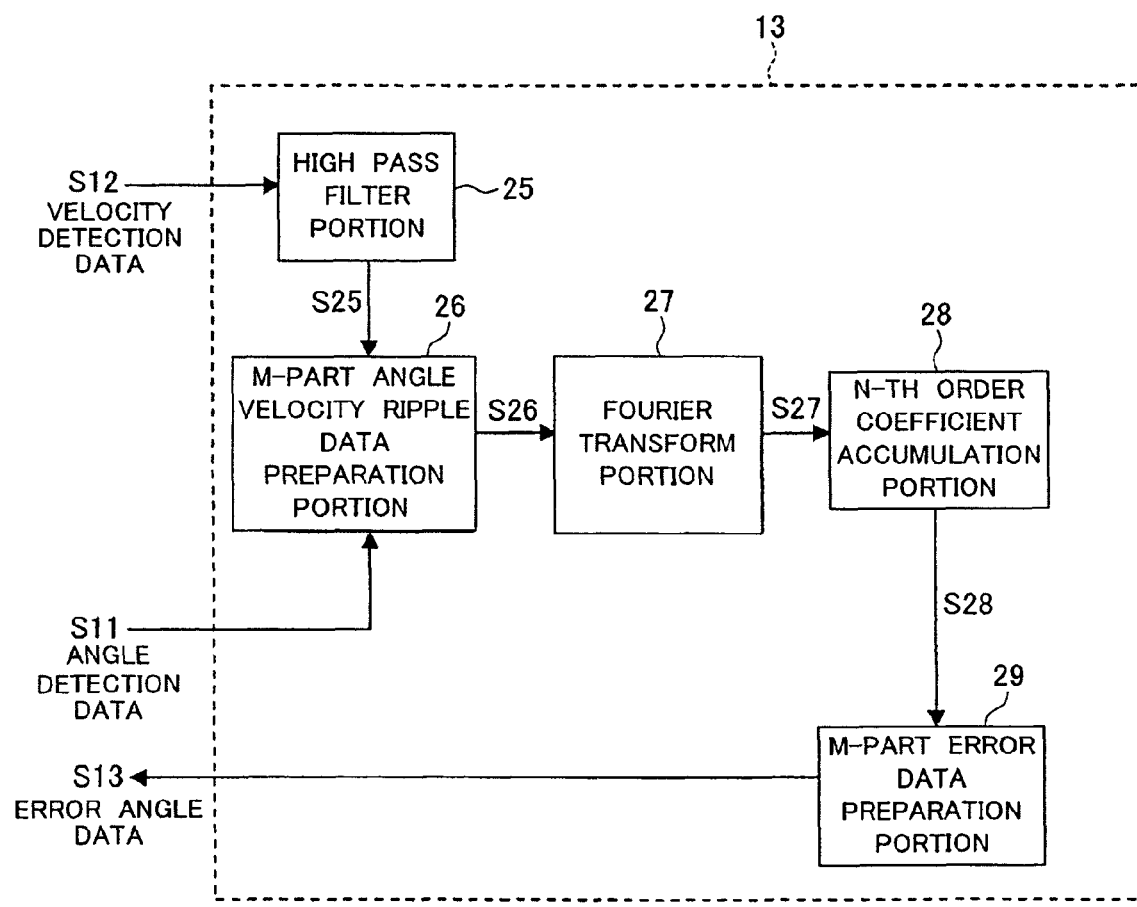
Figure 12:
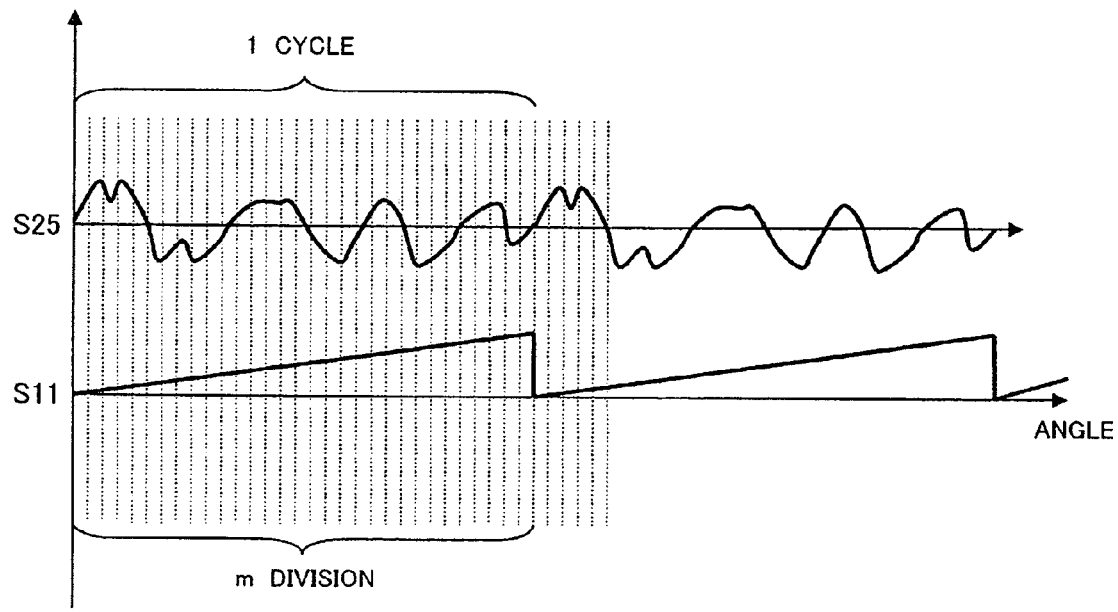
Figure 13:
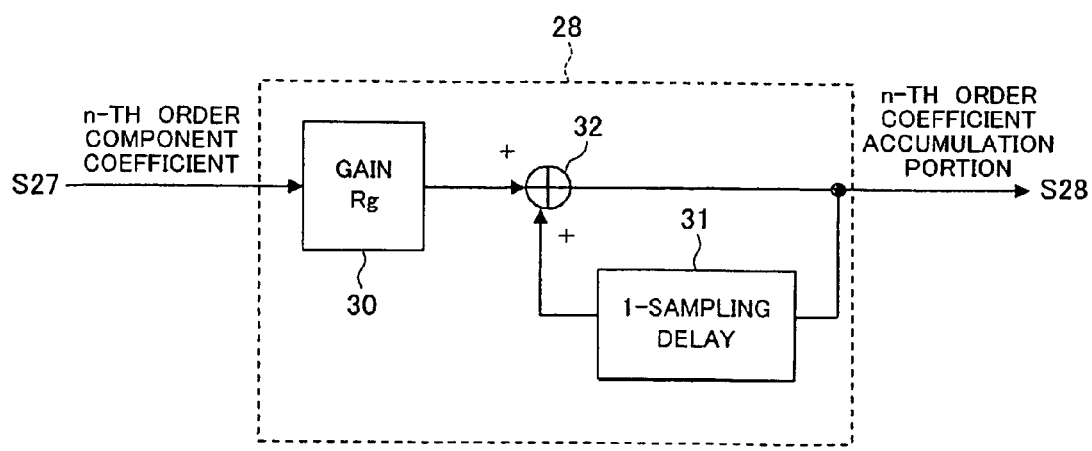
Figure 14:
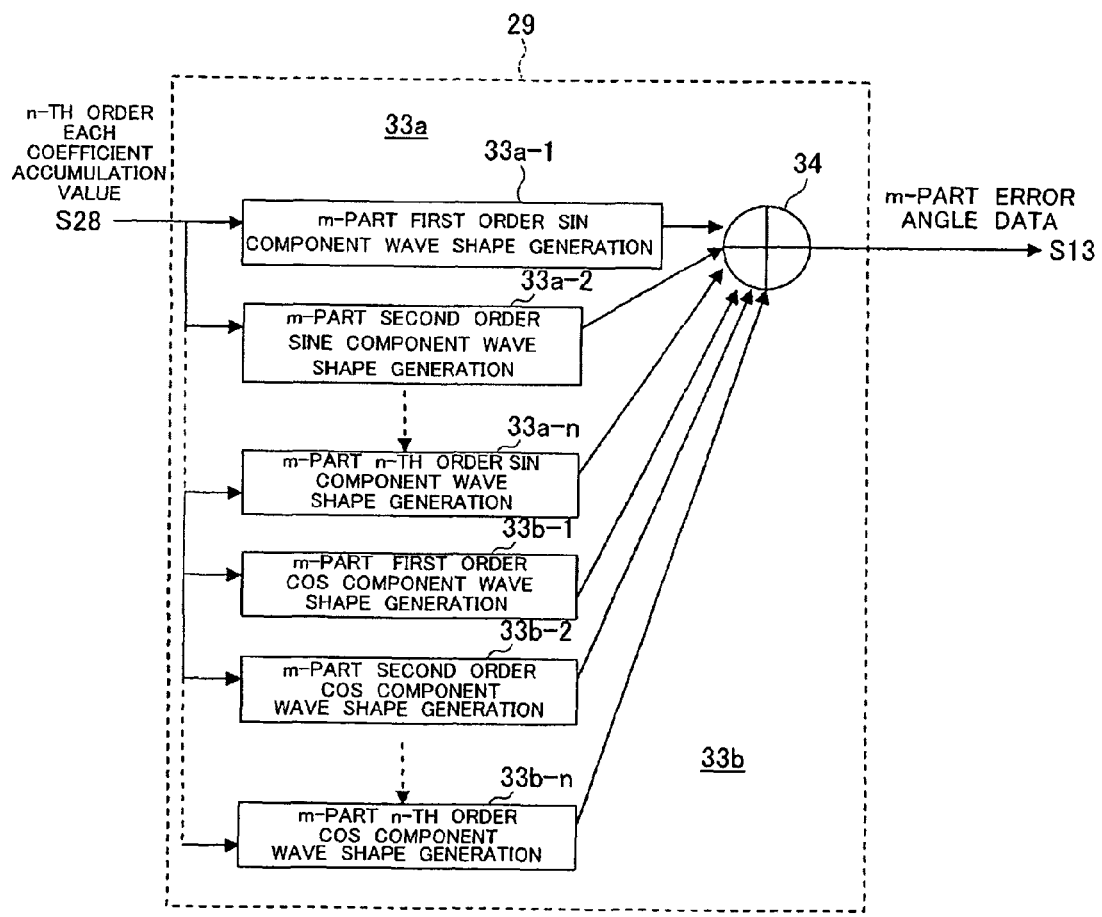
Figure 15:
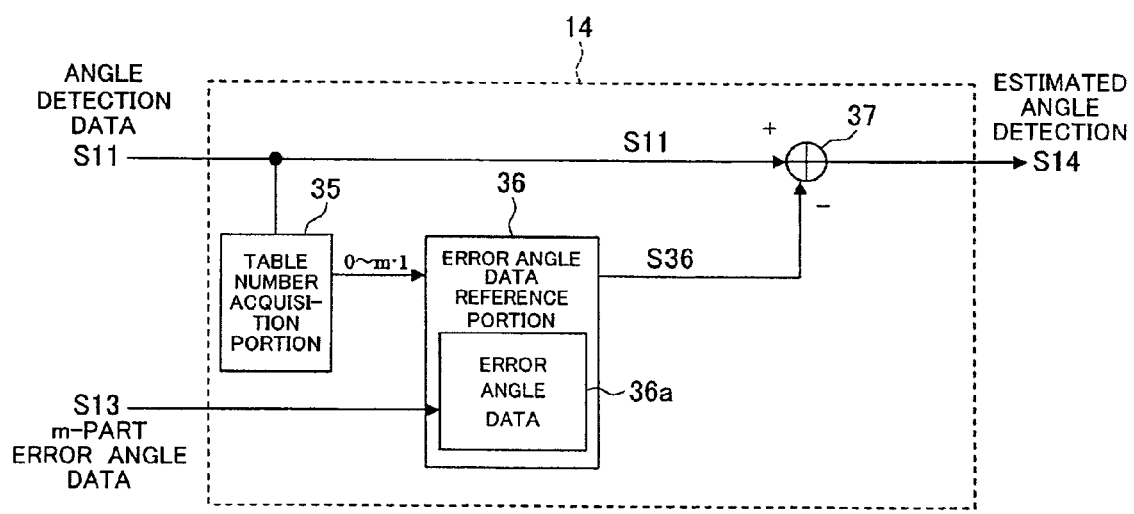

a FIG. 9 is a graph showing an output signal of a reference waveform generation circuit and an output signal of a comparator circuit in the angle detector illustrated in FIG. 8;

FIG. 10 is the circuit configuration of a velocity detector illustrated in FIG. 6;

FIG. 11 is a view of the circuit configuration of an angle error estimator illustrated in FIG. 6;

FIG. 12 is a graph showing an AC component velocity detection signal S25 output from a high pass filter portion in the angle error estimator illustrated in FIG. 11 and an angle detection signal S11 output from the angle detector illustrated in FIG. 6;

FIG. 13 is a diagram showing an example of the circuit configuration of an n-th order coefficient accumulation portion in the angle error estimator illustrated in FIG. 11;

FIG. 14 is a diagram showing the circuit configuration of an m-part error data preparation portion in the angle error estimator illustrated in FIG. 11; and FIG. 15 is a diagram showing the circuit configuration of an estimated angle generation circuit illustrated in FIG. 6.

In the figures, 7 indicates a resolver body, 4 indicates an SIN winding, 5 indicates a COS winding, 6 indicates a rotor winding, S6 indicates a rotor winding voltage, 100 indicates an angle detection device of a resolver, 8 indicates a first excite voltage generator, S8 indicates a SIN winding voltage, 9 indicates a second excite voltage generator, S9 indicates a COS winding voltage, 10 indicates a reception filter circuit, 11 indicates an angle detector, 17 indicates a reference waveform generation circuit, S17 indicates a reference waveform signal, 18 indicates a comparator circuit, S18 indicates a comparison result pulse signal, 19 indicates a phase difference count circuit, 20 indicates a count clock generator, S20 indicates a clock signal, 12 indicates a velocity detector 12, 23 indicates a 1-sampling delay circuit, 24 indicates a subtraction circuit, 13 indicates a angle error estimator, S13 indicates an estimated angle error signal, 25 indicates a high pass filter portion, 26 indicates a m-part angle velocity ripple data preparation portion, 27 indicates a Fourier transform portion, S27 indicates a Fourier transform coefficient, 28 indicates an n-th order coefficient accumulation portion, S28 indicates an n-th order coefficient accumulation value signal, 30 indicates a gain multiplier, 31 indicates a I-sampling delay circuit, 32 indicates an adder, 29 indicates m-part error angle data preparation portion, S29 indicates m-part error angle data, 33a indicates an m-part SIN component waveform generation portion, 33b indicates an m-part COS component waveform generation portion, 34 indicates an adder, 14 indicates an estimated angle generation circuit, S14 indicates an estimated angle detection signal, 35 indicates a table number acquisition portion, 36 indicates an error angle data reference portion, 36a indicates an error angle data table, and 37 indicates a subtraction portion.

DESCRIPTION OF THE PREFERRED EMBODIMENTS

An angle detection device of a resolver according to an embodiment of the present invention will be explained with reference to the attached drawings.

Resolver and Angle Detection Device

Figure 1:
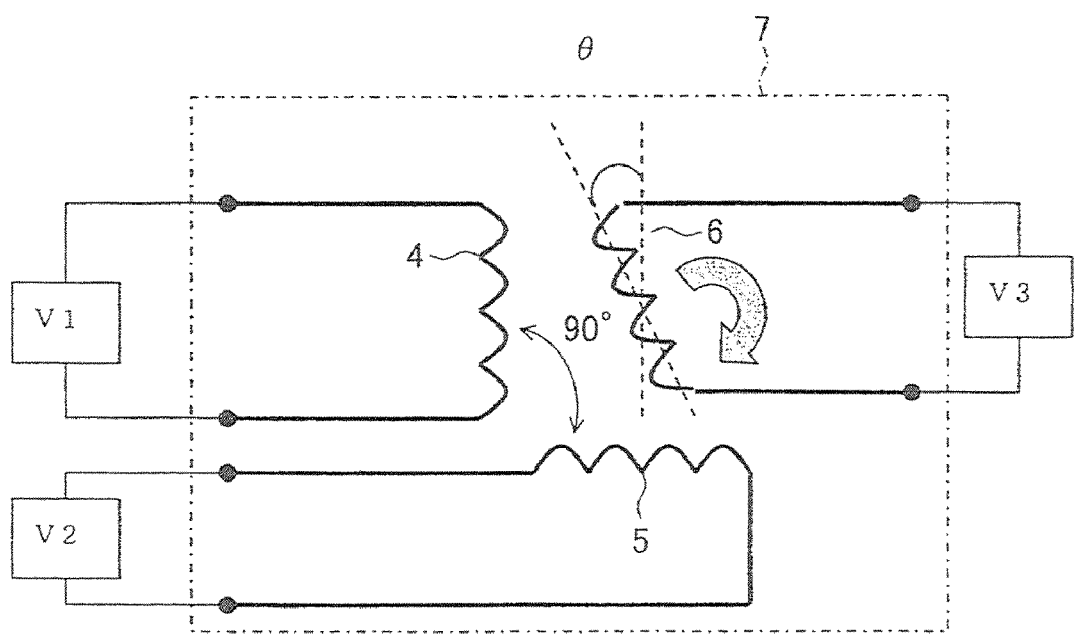
FIG. 1 is a diagram showing a schematic configuration of a resolver.

FIG. 6 is a view of the configuration of a resolver and an angle detection device according to an embodiment of the present invention. In FIG. 6, the resolver body 7, in the same way as explained with reference to FIG. 1, has an SIN winding 4 and a COS winding 5 arranged mechanically offset by 90 degrees to a stator side and has a rotor winding 6 disposed in the rotating part.

As resolvers, a two-phase excitation single output system and a single-phase excitation two-output system are known. In a resolver of the two-phase excitation single-phase output system, an SIN winding voltage and a COS winding voltage are applied to the SIN winding 4 and COS winding 5, and a signal corresponding to the rotational angle (or rotational position) of the object for which the rotational angle (or rotational position) is being detected (not shown) is detected from the rotor winding 6. On the other hand, in a resolver of the single-phase excitation two-phase output system, a sine wave voltage is applied to the rotor winding 6, and a voltage of a sine wave excite voltage amplitude modulated by an angle θ by the rotor winding 6 and stator is output to the SIN winding 4 and the COS winding 5. Below, a resolver of the two-phase excitation single output system will be explained as an example.

An angle detection device 100 of the resolver of a two-phase excitation single output system uses a rotor winding voltage S6 detected by the rotor winding 6 of the resolver body 7 to detect a rotational angle θ of an object for which the rotational angle (or rotational position) is being detected connected to the rotor winding 6, for example, the shaft of a motor rotating for driving an arm of a robot. Below, the object for which the angle is being detected connected to the rotor winding 6 will be explained with reference to, for example, the shaft of a motor driving an arm of a robot. The motor and the resolver can rotate forward rotation or reverse. However, in the following description, for simplifying the explanation, a case where the motor rotates in only one direction will be illustrated.

The angle detection device 100 of the resolver of a two-phase excitation single output system has an excitation counter 16, a first excite voltage generator 8, a second excite voltage generator 9, and a reception filter circuit 10. The angle detection device 100 of the resolver further has an angle detector 11, a velocity detector 12, an error estimator 13, and an estimated angle generation circuit 14.

In the specification of the present application, the "resolver apparatus" means an apparatus including the resolver body 7 and the angle detection device 100 of the resolver. On the other hand, in the specification of the present application, the "angle detection device of the resolver" means the parts other than the resolver body 7 illustrated in FIG. 6, that is, the excitation counter 16, first excite voltage generator 8, second excite voltage generator 9, reception filter circuit 10, angle detector 11, velocity detector 12, error estimator 13, and estimated angle generation circuit 14. Note, as apparent from the later description, functionally, the excitation counter 16, first excite voltage generator 8, and second excite voltage generator 9 which drive the resolver body 7 are called the "resolver" together with the resolver body 7 and can be excluded from the angle detection device of the resolver.

Excitation Counter

The excitation counter 16 generates a counter output pulse signal S16 for generating the SIN winding voltage S8 and the SIN winding voltage S8 in the first excite voltage generator 8 and the second excite voltage generator 9. The excitation counter 16 has a clock pulse oscillator generating a clock pulse of a predetermined frequency defining the angle detection precision (resolution) of the resolver and a counter counting the clock pulses and outputs clock pulses counted at the counter as counter output pulse signals S16 to the first excite voltage generator 8, second excite voltage generator 9, and angle detector 11.

First Excite Voltage Generator and Second Excite Voltage Generator

Figure 7:
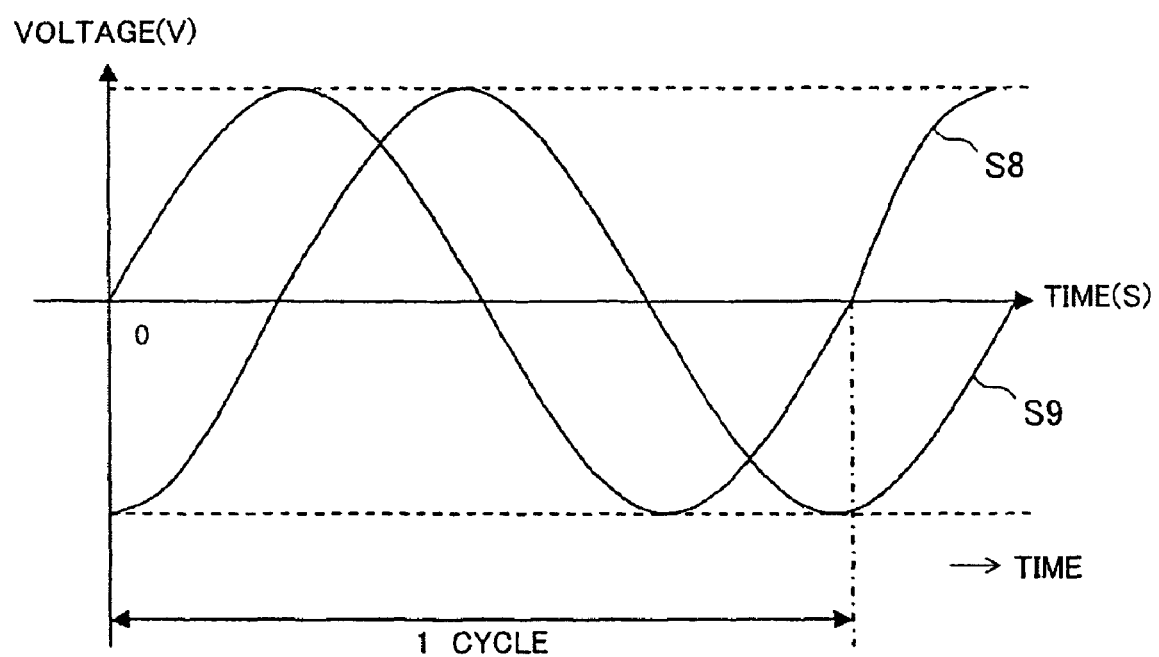
FIG. 7 is a graph illustrating a SIN winding voltage and a COS winding voltage applied to a SIN winding and a COS winding in FIG. 6.

The first excite voltage generator 8 and the second excite voltage generator 9, as illustrated in FIG. 7, generate the SIN winding voltage S8 and COS winding voltage S9 exciting the SIN winding 4 and the COS winding 5 based on the counter output pulse signals S16 and apply these to the SIN winding 4 and the COS winding 5. FIG. 7 is a graph illustrating the SIN winding voltage S8 and the COS winding voltage S9. Note that either the phase of the SIN winding voltage S8 or the phase of the COS winding voltage S9 may lead the other so long as if there is a phase difference of 90 degrees.

For example, where the excitation frequency in the excitation counter 16 is 5 kHz and the frequency of the counter clock (clock pulse) is 50 MHz, the excitation counter 16 outputs in 200 μs a counter output pulse signal S16 increasing from "0000" to "9999" as a numerical value expressing one rotational angle range of the object for which the rotational angle is being detected, i.e., 0 to 360 degrees, is reset when exceeding "9999", then outputs a counter output pulse signal S16 increasing from "0000" to "9999", again. The excitation counter 16 repeats this operation.

As concrete examples of the circuits of the first excite voltage generator 8 and second excite voltage generator 9, for example, a cosine function generator and a sine function generator are configured using read only memories (ROM). It is possible to read out the SIN and COS values by a table look-up system using the ROMs using the counter output pulse signal S16 as an address signal. For example, whenever a counter output pulse signal S16 is applied, the first excite voltage generator 8 having a ROM receives as input the counter output pulse signal S16 as the address signal corresponding to an angle α of sin α to the ROM and generates a SIN winding voltage S8 having a waveform illustrated in FIG. 7. In the same way, whenever a counter output pulse signal S16 is applied, the second excite voltage generator 9 having a ROM receives as input the counter output pulse signal S16 as the address signal corresponding to an angle α of cos α to the ROM and generates a COS winding voltage S9 having a waveform illustrated in FIG. 7.

Note that, the function generators in the first excite voltage generator 8 and the second excite voltage generator 9 do not have to cover all of 0 to 360 degrees as the angle α. It is sufficient that they can generate values of sin α and cos α within a range of 45 degrees or 90 degrees. Further, by utilizing the fact that the sin α and the cos α are offset by a phase of 90 degrees, but are the same in waveforms, that is, by adjusting the angles, the same part can be used for the first excite voltage generator 8 and the second excite voltage generator 9. As a result, the circuit configurations of the first excite voltage generator 8 and the second excite voltage generator 9 become further simpler.

In a state where the SIN winding 4 is excited by the SIN winding voltage S8 generated by the method explained above, and the COS winding 5 is excited by the second excite voltage generator 9 generated by the method explained above, the rotational angle (or rotational position) of the object for which the rotational angle is being detected connected to the rotor winding 6, for example, the motor, is detected at the rotor winding 6 as the rotor winding voltage S6 and applied to the reception filter circuit 10.

Reception Filter Circuit

The reception filter circuit 10 is an analog filter circuit passing signals of predetermined components included in the rotor winding voltage S6 detected at the rotor winding 6, particularly, frequency components near the excitation frequency, for example, an analog low pass filter or analog band pass filter. The resolver body 7 is sometimes placed in an environment including noise or there are noise components in a transmission route of the rotor winding voltage S6 and noise is superposed on the rotor winding voltage S6 before it reaches the reception filter circuit 10. The reception filter circuit 10 eliminates such noise components and extracts components near the excitation frequency which are effective for the signal processing explained later. Note that, the reception filter circuit 10 is not an element indispensable for forming the angle detection device 100 of the resolver, but is desirably provided in order to achieve the above object.

Angle Detector

The angle detector 11 uses the rotor winding detection signal S10 indicating the rotational position or angle of the object for which the rotational angle is being detected from the reception filter circuit 10 has eliminated the noise and the counter output pulse signal S16 from the excitation counter 16 to detect the angle (or rotational position). Details of this will be explained later with reference to FIG. 8.

Velocity Detector

The velocity detector 12 detects the rotational velocity of the object for which the rotational angle is being detected connected to the rotor winding 6, for example, a motor, from the angle detection signal S11 detected at the angle detector 11. Details of the velocity detector 12 will be explained later with reference to FIG. 10.

Angle Error Estimator

The angle error estimator 13 uses the rotational velocity signal S12 detected at the velocity detector 12 and the angle detection signal S11 detected at the angle detector 11 to estimate a detection error in the detection angle including the detection error detected at the rotor winding 6 and outputs an estimated angle error signal S13. Details of the angle error estimator 13 will be explained later with reference to FIG. 11.

Estimated Angle Generation Circuit

The estimated angle generation circuit 14 uses the estimated angle error signal S13 estimated at the angle error estimator 13 to correct the angle detection signal S11 detected at the angle detector 11 and generate an estimated angle detection signal S14. This estimated angle detection signal S14 indicates the correct angle for which the detection error is corrected. Details of the estimated angle generation circuit 14 will be explained with reference to FIG. 15. The estimated angle detection signal S14 is output as the angle detection signal to, for example, the object of control and the object of detection of the rotational angle, for example, the control device of the motor driving the arm of the robot.

Angle Detector

FIG. 8 is a view of the circuit configuration of the angle detector 11. The angle detector 11 has a reference waveform generation circuit 17, a comparator circuit 18 to which the rotor winding detection signal S10 is input, a phase difference count circuit 19, and a counter clock generator 20 and outputs the angle detection signal S11 from the phase difference count circuit 19. FIG. 9 is a graph showing an output signal S17 of the reference waveform generation circuit 17 and the output signal of the comparator circuit 18.

The reference waveform generation circuit 17 receives as input the counter output pulse signal S16 from the excitation counter 16 and generates the reference waveform signal of one rotation of the object for which the rotational angle is being detected, for example, a motor. Concretely, as illustrated in FIG. 9, it generates the reference waveform signal S17 of a reference waveform which is turned on/off (high level "H" and low level "L" alternately output) in 1 cycle (1 cycle τ=1/excitation frequency) of the excitation frequency by the counter output pulse signal S16.

The comparator circuit 18 detects the position of a "0 volt" voltage passed through when the rotor winding detection signal S10 of the rotor winding voltage S6 of the rotor winding 6 passing through the reception filter circuit 10 changes from positive to negative and when it changes from negative to positive inverse to that, that is, a zero cross position, converts, for example, the time when the rotor winding detection signal S10 changes from positive to negative to a rectangular wave of a low level "L", converts the time when the rotor winding detection signal S10 changes from negative to positive to a rectangular wave of a high level "H", and generates a comparison result pulse signal S18.

The counter clock generator 20 generates a clock signal S20 having a resolution for detecting a phase difference between the reference waveform signal S17 and the comparison result pulse signal S18 and outputs it to the phase difference count circuit 19.

The phase difference count circuit 19 detects a phase difference a between the reference waveform signal S17 and the comparison result pulse signal S18 (FIG. 8) based on the clock signals S20 from the counter clock generator 20 and outputs it as the angle detection signal S11 indicating the phase difference α. For example, the phase difference count circuit 19 counts the clock signals S20 from a point of time of the rising edge from the reference waveform signal S17 and suspends counting of the clock signals S20 at a point of time of the rising edge of the comparison result pulse signal S18. This count value in the phase difference count circuit 19 indicates the phase difference α. This phase difference a corresponds to the rotational angle of the object for which the rotational angle is being detected, for example, a motor, and corresponds to the angle θ of the rotor winding 6 with the stator.

For example, when the excitation frequency at the excitation counter 16 is 5 kHz and the frequency of the clock signal S20 of the counter clock generator 20 is 50 MHz, as explained above for the excitation counter 16, because "0000" to "9999" corresponds to 0 to 360 degrees, for example, the angle θ becomes 90 degrees in a case where the count value of the phase difference count circuit 19 is "2499".

Velocity Detector 12

FIG. 10 shows the circuit configuration of the velocity detector 12. The velocity detector 12 is configured by a 1-sampling delay circuit 23 and a subtraction circuit 24. The velocity can be found by differentiating the positions or angles or by a difference between positions or between angles. The velocity detector 12 detects the velocity according to this method. The 1-sampling delay circuit 23 delays the angle detection signal S11 by 1 sampling time. The subtraction circuit 24 calculates a difference between the current angle detection signal S11 and the previous angle detection signal S11 passed through the 1-sampling delay circuit 23 and delayed by 1 sampling. By calculation of this difference, a signal corresponding to the velocity of the angle detection signal S11, that is, the velocity detection signal S12, is obtained. The delay of the angle detection signal S11 by 1 sampling time in the 1-sampling delay circuit 23 actually means that the previous angle detection signal s11 is stored and the stored result is utilized for the current processing. The 1-sampling delay circuit 23 is configured by a memory, a register, etc.

Angle Error Estimator 13

FIG. 11 is a view of the circuit configuration of the angle error estimator 13. The angle error estimator 13, according to the basic concept of the method of detection of the detection error explained above, that is, by utilizing the fact the angle detection error waveform of the resolver is comprised of predetermined n-th order components inherent to the resolver, performs frequency analysis, for example, Fourier transform processing, on the velocity signal including detection error generated from the detected angle signal including error to calculate the magnitude of the detection error for each of the plurality of divided components, combines the calculated detection errors to reproduce the detection error included in the rotor winding voltage S6, and generates an error waveform signal. Note that in order to converge the detection errors, preferably, the magnitudes (spectra) of components of the Fourier transform are multiplied by a gain and accumulated. The sine wave of the converged n-th order components and the cosine wave of the n-th order components are added to calculate the error angle data to obtain an estimated angle error signal. This generated error waveform signal is the estimated angle error signal S13 for correcting the angle detection signals detected at the rotor winding 6 and the angle detector 11 in the estimated angle generation circuit 14 explained later.

Below, details of the angle error estimator 13 will be explained. The angle error estimator 13 has a high pass filter portion 25, an m-part angle velocity ripple data preparation portion 26, a Fourier transform portion 27, an n-th order coefficient accumulation portion 28, and an m-part error data preparation portion 29. FIG. 12 is a graph showing an AC component velocity detection signal S25 output from the high pass filter portion 25 and the angle detection signal S11. In FIG. 12, the abscissa indicates the angle, and the ordinate indicates the amplitude of the signal in each angle region. In FIG. 12, the angle detection signal S11 is illustrated as a sawtooth signal which increases from 0 degree toward 360 degrees, is reset to 0 when reaching 360 degrees, and increases from 0 degree to 360 degrees again.

The high pass filter portion 25 generates the AC component velocity detection signal S25 by passing the high frequency component, that is, the AC component, in the velocity detection signal S12 including the detection error component input from the velocity detector 12. The high pass filter portion 25 is, for example, an analog high pass filter portion 25.

The m-part angle velocity ripple data preparation portion 26 receives as input the angle detection signal S11 input from the angle detector 11 and the AC component velocity detection signal S25 and, as illustrated in FIG. 11, divides the AC component velocity detection signal S25 including the detection error component to a plurality of regions, for example, m number of regions, based on the angle detection signal S11 changing from 0 degree to 360 degrees, calculates a velocity ripple (fluctuation) value of the AC component velocity detection signal S25 for each of the divided regions, and outputs the same as the m-part angle velocity ripple data S26. Note that, in a case where the sampling can be carried out many times in the same region, the precision can be raised by using an average value thereof.

The Fourier transform portion 27 applies a Fourier transform to the m-part angle velocity ripple data S26 generated at the m-part angle velocity ripple data preparation portion 26 to find the n-th order components. The general Fourier transform will be shown in the following formulas (1-1) to (1-4):

<General Formula of Fourier Transform>

$$f(x) = \begin{matrix} a_0 + a_1 \cdot \cos x + b_1 \cdot \sin x + a_2 \cdot \cos 2x + \\ b_2 \cdot \sin 2x + \ldots + a_n \cdot \cos nx + b_n \cdot \sin nx \end{matrix} \quad (1\text{-}1)$$

$$a_n = \frac{1}{\pi} \int_0^{2\pi} f(x) \cdot \cos nx \, dx \quad (1\text{-}2)$$

$$b_n = \frac{1}{\pi} \int_0^{2\pi} f(x) \cdot \sin nx \, dx \quad (1\text{-}3)$$

$$a_0 = \frac{1}{2\pi} \int_0^{2\pi} f(x) \, dx \quad (1\text{-}4)$$

The Fourier transform in a case of dividing the angle range of 0 to 360 degrees to m number of regions in the m-part angle velocity ripple data preparation portion 26 can be expressed by the following formulas (2-1) to (2-4):

<Formula when Dividing Detection Angle by m>

$$f(x) = \begin{matrix} a_0 + a_1 \cdot \cos pk + b_1 \cdot \sin pk + a_2 \cdot \cos 2pk + \\ b_2 \cdot \sin 2pk + \ldots + a_n \cdot \cos npk + b_n \cdot \sin npk \end{matrix} \quad (2\text{-}1)$$

$$\text{but } k = 0 \sim (m-1),\ p = \frac{2\pi}{m}$$

$$a_n = \frac{2}{m} \sum_{k=0}^{m-1} f(k) \cdot \cos npk \quad (2\text{-}2)$$

$$b_n = \frac{2}{m} \sum_{k=0}^{m-1} f(k) \cdot \sin npk \quad (2\text{-}3)$$

$$a_0 = \frac{1}{m} \sum_{k=0}^{m-1} f(k) \quad (2\text{-}4)$$

When the signal indicating the waveform of the angle is $f_1(k)$, a signal $f_1'(k)$ indicating the velocity waveform obtained by differentiating the angle $f_1(k)$ can be expressed by the following formula:

$$f_1'(k) = -a_1 p \sin pk + b_1 p \cos pk - a_2 p \sin 2pk + b_2 p \cos 2pk + \ldots - a_n p \sin npk + b_n p \cos npk \quad (3\text{-}1)$$

A Fourier transform formula $f_2(k)$ of the m-part angle velocity ripple data S26 for the velocity waveform signal $f_1'(k)$ generated at the m-part angle velocity ripple data preparation portion 26 is defined by the following formula (4-1):

$$f_2(k) = a_{s1} \cos pk + b_{s1} \sin pk - a_{s2} \cos 2pk + b_{s2} \sin 2pk + \ldots - a_{sn} \cos npk + b_{sn} \sin npk \quad (4\text{-}1)$$

When comparing coefficients of formula (3-1) and formula (4-1), these become the following formulas (5-1) to (5-4).

$$\text{due to } -a_1 p = b_{s1},\ a_1 = -b_{s1} \div p \quad (5\text{-}1)$$

$$\text{due to } -b_1 p = a_{s1},\ b_1 = a_{s1} \div p \quad (5\text{-}2)$$

$$\text{due to } -a_2 p = b_{s2},\ a_2 = -b_{s2} \div p \quad (5\text{-}3)$$

$$\text{due to } -a_2 p = a_{s2},\ b_2 = a_{s2} \div p \quad (5\text{-}4)$$

$$\vdots \qquad \vdots$$

Finally, the coefficients can be expressed by the following formulas (6-1) and (6-2):

$$a_n = -\frac{1}{\pi} \sum_{k=0}^{m-1} f(k) \cdot \sin npk \quad (6\text{-}1)$$

$$b_n = \frac{1}{\pi} \sum_{k=0}^{m-1} f(k) \cdot \cos npk \quad (6\text{-}2)$$

The Fourier transform portion 27 performs the processing explained above for the m-part angle velocity ripple data S26 for the velocity waveform signal $f_1'(k)$ and outputs the result as a Fourier transform coefficient S27 having coefficients $a_n$ and $b_n$ of n-th order components indicated by formulas (6-1) and (6-2). Namely, the Fourier transform portion 27 performs the processing of formulas (6-1) and (6-2) for the m-part angle velocity ripple data S26 for the velocity waveform signal $f_1'(k)$.

The Fourier transform portion 27 can perform the processings of SIN and COS in formulas (6-1) and (6-2) as they are as software signal processing using a computer. Note that the Fourier transform in the Fourier transform portion 27 may be applied to only the major order components and does not have to be applied to the entire frequency range. As a result, the configurations of the Fourier transform portion 27 and the processing circuit following the Fourier transform portion 27 become simpler, and the signal processing time is shortened. Further, as the Fourier transform processing in the Fourier transform portion 27, for example, it is possible to apply a Fast Fourier Transform (FFT) technique greatly reducing the multiplication processing and improving the processing speed.

On the other hand, in order to shorten the processing time and to realize the object more conveniently, software processing using a computer is not carried out. For example, in the same way as explained for the first excite voltage generator 8 and the second excite voltage generator 9, the sine wave functions and cosine wave functions are stored as a table in the read only memory (ROM) as an example of the function generator, n angle parameter is used as the address signal of the ROM, and values of SIN and COS in formulas (6-1) and (6-2) are generated by looking up the table.

N-th Order Coefficient Accumulation Portion 28

FIG. 13 is a diagram showing an example of the circuit configuration of the n-th order coefficient accumulation portion 28. The n-th order coefficient accumulation portion 28 accumulates the n-th orders obtained at the Fourier transform portion 27. The n-th order coefficient accumulation portion 28 has a gain multiplier 30, an adder 32, and a 1-sampling delay circuit 31. The gain multiplier 30 multiplies the gain Rg with the Fourier transform coefficient of the n-th order component obtained by the Fourier transform which was output as the Fourier transform coefficient S27. Note that, the gain Rg is made a value smaller than 1 in order to make the detection errors converge in the present embodiment. Further, the gain Rg is desirably adjusted matching with the state so that the detection errors converge by averaging the noise and variation.

An integration circuit is configured by the adder 32 and the 1-sampling delay circuit 31. For example, the 1-sampling delay circuit 31 is configured as a memory or register holding the previous value. The circuit integrates the results from the gain multiplier 30 by adding, at the adder 32, the current output value from the gain multiplier 30 and the previous output value from the 1-sampling delay circuit 31. An n-th order coefficient accumulation value signal S28 including the accumulated value of the n-th order coefficients obtained in this way is output to the m-part error data preparation portion 29.

m-Part Error Angle Data Preparation Portion 29

FIG. 14 is a diagram showing the circuit configuration of the m-part error angle data preparation portion 29. The m-part error angle data preparation portion 29 has an m-part SIN component waveform generation portion 33*a*, an m-part COS component waveform generation portion 33*b*, and an adder 34. The m-part SIN component waveform generation portion 33*a* has n number of m-part n-th order SIN component waveform generation portions provided corresponding to the coefficient accumulation values of the n-th order components included in the n-th order coefficient accumulation value signal S28 output from the n-th order coefficient accumulation portion 28, for example, an m-part first order SIN component waveform generation portion 33*a*-1 and an m-part second order SIN component waveform generation portion 33*a*-2 to an m-part n-th order SIN component waveform generation portion 33*a*-*n*. In the same way, the m-part COS component waveform generation portion 33*b* has n number of m-part n-th order COS component waveform generation portions provided corresponding to the coefficient accumulation values of the n-th order components included in the n-th order coefficient accumulation value signal S28 output from the n-th order coefficient accumulation portion 28, that is, an m-part first order COS component waveform generation portion 33*b*-1 and an m-part second order COS component waveform generation portion 33*b*-2 to an m-part n-th order COS component waveform generation portion 33*b*-*n*.

In the m-part SIN component waveform generation portion 33*a*, the signal processing explained below is carried out for each of the regions obtained by division of one rotation of the object for which the rotational angle is being detected, that is, a motor, that is, an angle range of 0 to 360 degrees to m number of regions as illustrated in FIG. 12. In the m-part first order SIN component waveform generation portion 33*a*-1, a waveform signal of the first order SIN component is generated by using the Fourier transform coefficient accumulation value of the first order component included in the n-th order coefficient integration value signal S28. In the m-part second order SIN component waveform generation portion 33*a*-2, a waveform signal of the second order SIN component is generated by using the Fourier transform coefficient accumulation value of the second order component included in the n-th order coefficient integration value signal S28. Below, in the same way, in the m-part n-th order SIN component waveform generation portion 33*a*-*n*, a waveform signal of the n-th order SIN component is generated by using the Fourier transform coefficient accumulation value of the n-th order component included in the n-th order coefficient integration value signal S28.

In the m-part COS component waveform generation portion 33*b* as well, the signal processing explained below is carried out for each of the regions obtained by division of one rotation of the object for which the rotational angle is being detected, the motor, that is, the angle range of 0 to 360 degrees, to m number of regions as illustrated in FIG. 12. In the m-part first order COS component waveform generation portion 33*b*-1, a waveform signal of the first order COS component is generated by using the Fourier transform coefficient accumulation value of the first order component included in the n-th order coefficient integration value signal S28. In the m-part second order COS component waveform generation portion 33*b*-2, a waveform signal of the second order COS component is generated by using the Fourier transform coefficient accumulation value of the second order component included in the n-th order coefficient integration value signal S28. Below, in the same way, in the m-part n-th order COS component waveform generation portion 33*b*-*n*, a waveform signal of the n-th order COS component is generated by using the Fourier transform coefficient accumulation value of the n-th order component included in the n-th order coefficient integration value signal S28.

As described above, the first order to the n-th order SIN component waveform signals for the m-part regions found at the m-part SIN component waveform generation portion 33*a*, and the first order to the n-th order COS component waveform signals for the m-part regions found at the m-part COS component waveform generation portion 33*b* are added at the adder 34 to reproduce the detection error and generate the estimated angle error signal S13.

Overall Operation of Angle Error Estimator 13

The overall operation of the angle error estimator 13 using the angle detection signal S11 detected at the angle detector 11 and the rotational velocity signal S12 detected at the velocity detector 12, explained with reference to FIG. 11 to FIG. 14, to generate the estimated angle error signal S13 will be organized and explained next. The high pass filter portion 25 passes the AC component of the velocity detection signal S12 including the detection error to generate an AC component velocity detection signal S25, while the m-part angle velocity ripple data preparation portion 26 divides the AC component velocity detection signal S25 including the detection error to m number of regions based on the angle detection signal S11 to generate the m-part angle velocity ripple data S26. The Fourier transform portion 27 applies a Fourier transform to m-part angle velocity ripple data S26 including detection error to generate a Fourier transform coefficient S27. The n-th order coefficient accumulation portion 28 integrates the n-th order Fourier transform coefficients included in the Fourier transform coefficient S27 to calculate the n-th order coefficient accumulation value signals S28. The m-part error angle data preparation portion 29 combines the n-th order coefficient accumulation value signals S28 to generate the estimated angle error signal S13.

Estimated Angle Generation Circuit 14

FIG. 15 is a diagram showing the circuit configuration of the estimated angle generation circuit 14. The estimated angle generation circuit 14 corrects the angle detection signal S11 including detection error output from the angle detector 11 by the estimated angle error signal S13 output from the angle error estimator 13 to generate the estimated angle detection signal S14. The estimated angle generation circuit 14 has a table number acquisition portion 35, an error angle data reference portion 36, and a subtraction portion 37.

The error angle data reference portion 36 is configured as a memory. An error angle data storage portion 36a is provided (defined) in this memory. The a estimated angle error signal S13 generated at the angle error estimator 13 is stored in this error angle data storage portion 36a. The table number acquisition portion 35 generates an address signal S35 for reading out the estimated angle error signal S13 stored in the error angle data storage portion 36a from the angle detection signal S11. The error angle data reference portion 36 reads out the corresponding error angle data S36 from the error angle data storage portion 36a based on the address signal S35. The subtraction portion 37 subtracts the error angle data S36 from the angle detection signal S11 to correct the angle detection signal S11 and generates the estimated angle detection signal S14. Note that it is also possible to use an adder in place of the subtractor 37, add the error angle data S36 to the angle detection signal S11, and correct the angle detection signal S11.

Figure 2:
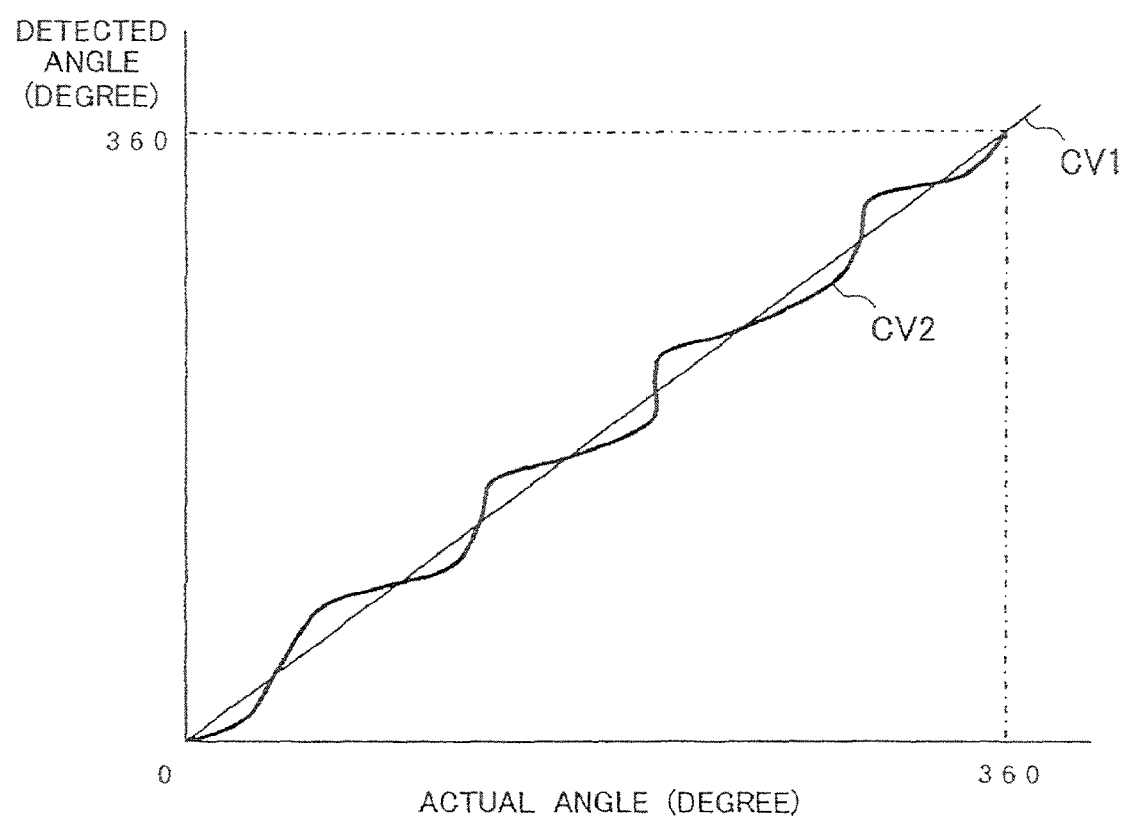
FIG. 2 is an illustrative graph showing a detection error of the resolver.
Figure 3:
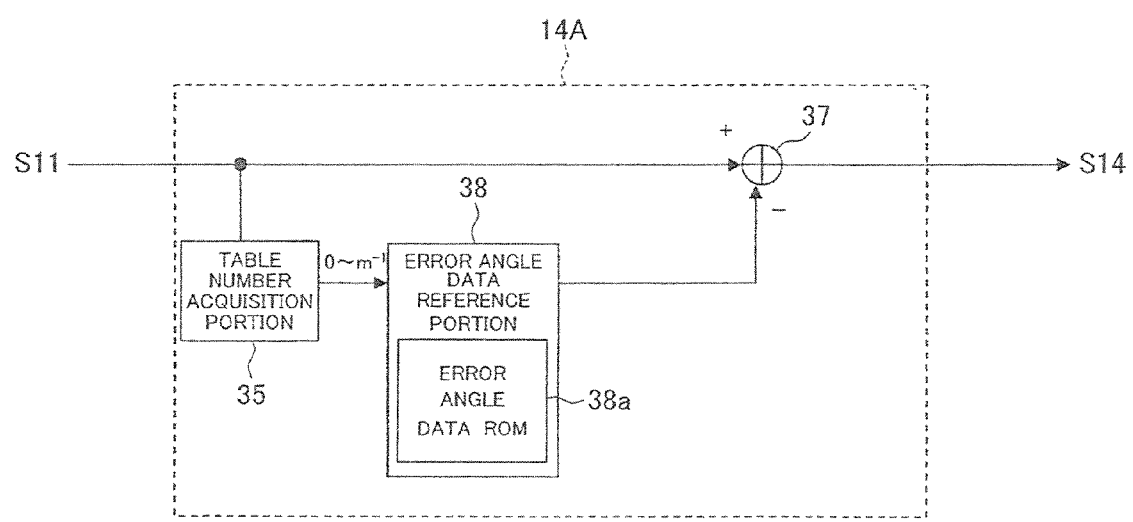
FIG. 3 is a diagram showing the circuit configuration of a conventional estimated angle generation circuit.
Figure 4:
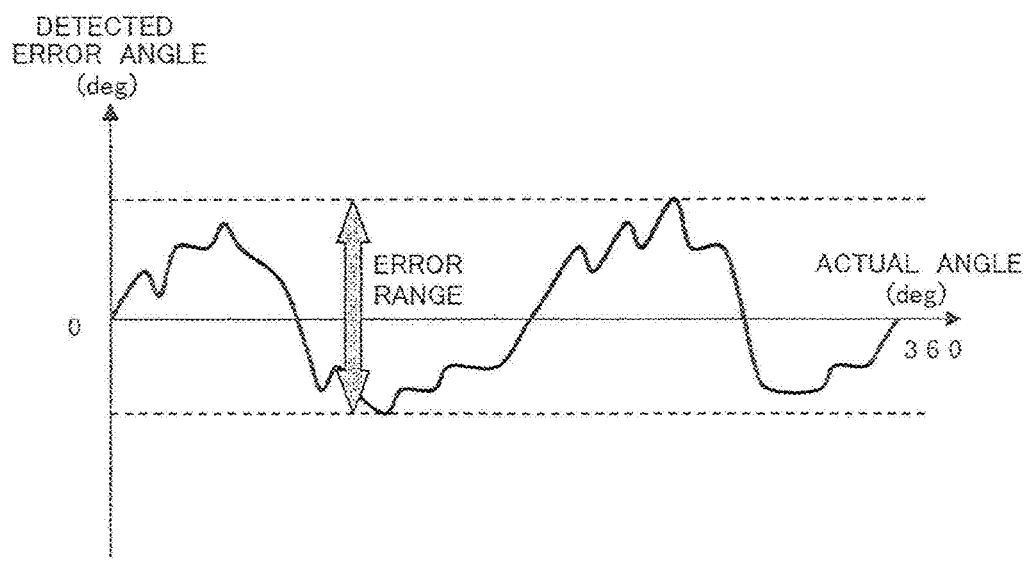
FIG. 4 is a graph illustrating the relationship between error components and actual angles illustrated in FIG. 2.
Figure 5:
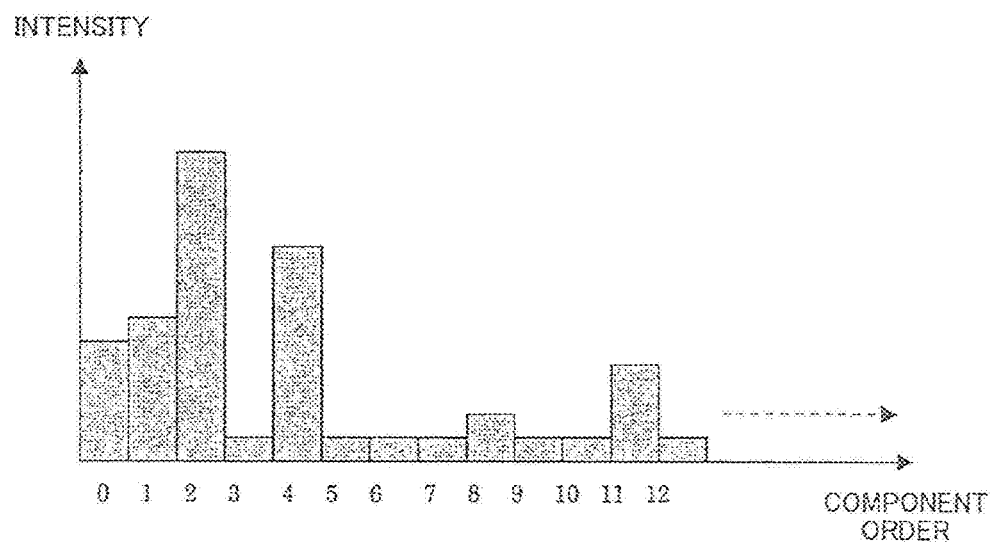
FIG. 5 is a graph showing an example of results of applying a Fourier transform to error components.

By the above processing, the detection error of the angle detection signal S11 including a large detection error explained with reference to FIG. 2 is corrected and a high precision angle detection signal is obtained.

The processing operation using the angle detector 11, velocity detector 12, and angle error estimator 13 in the angle detection device 100 of the resolver explained above is usually carried out only in an initial state when the object for which the rotational angle is being detected is attached to the rotor winding and the resolver and the angle detection device 100 are connected. The angle error estimator 13 includes the Fourier transform portion 27 requiring a relatively long processing time. However, it is processing performed in advance before the real time detection of the angle, therefore it does not become a load in terms of the processing time when actually correcting the angle. When obtaining the angle of the object for which the rotational angle is being detected in real time, the estimated angle generation circuit 14 only uses the estimated angle error signal S13 obtained as explained above to correct the angle detection signal S11, therefore this can be handled in real time. Namely, if using the angle detection device of the resolver of the embodiment of the present invention, it is possible to provide the angle (or rotational position) signal with a high precision in real time. Namely, it is possible to generate the error angle data S36 in real time and possible to use this as the angle sensor of the object for which the rotational angle is being detected in real time. In this way, the present embodiment differs from the art described in Japanese Patent Publication (A) No. 11-118520 in that angle detection with good precision is possible in real time.

Further, after attaching the resolver body 7 to the object for which the rotational angle is being detected on site after shipping, it is possible to easily correct the detection error. From the above, it becomes possible for a user to correct the detection error in the operation of an actual machine even when using a durable resolver using the angle detection device 100 of the resolver as the angle sensor of the servo motor.

Note that, the present embodiment, as a preferred example, the case of using a Fourier transform in the Fourier transform portion 27 was illustrated. However, in general, the frequency analysis can be widely applied in place of the Fourier transform portion 27. As such frequency analysis, a known technique shortening the processing time, for example, a discrete cosine transform, can be applied.

A resolver apparatus of the two-phase excitation single output system was illustrated above, but the present invention can also be applied for a resolver apparatus of the single-phase excitation two-output system. In a resolver apparatus of the single-phase excitation two-output system, in FIG. 6, a sine wave excite voltage is applied to the rotor winding 6. The sine wave excite voltage is amplitude modulated by the angle θ of the rotor winding 6 and the stator. The resultant voltage is detected at the SIN winding 4 and the COS winding 5. In a resolver of the single-phase excitation two-output system, the method of detecting the angle signal from among signals detected at the SIN winding 4 and the COS winding 5 can be the same method as a known method, for example, the method described in Japanese Patent Publication (A) No. 11-118520. The rest of the method after the method of generating the velocity detection signal S12 from the detected angle detection signal S11 and the hardware configuration are the same as those explained above. By calculating the estimated angle error signal S13 in this way and correcting the detection angle by using that estimated angle error signal S13, an angle signal with a high precision can be provided in real time for a resolver of the single-phase excitation two-output system as well.

The circuit configuration of the present embodiment explained above can be realized by combining existing circuits of relatively simple configurations. Accordingly, the angle detection device 100 of the resolver is easy to realize and can be produced at a low cost without increasing the size of the apparatus.

The above embodiment is an example. It is self-evident that the angle detection device of the resolver of the present invention is not limited to the illustrated circuit configuration.

Accordingly, persons skilled in the art can make various modifications applying the above-mentioned technical idea of the present invention. Such modifications are included in the present invention.

What is claimed is:

1. An angle detection device of a resolver comprising:
an angle detector detecting an angle signal of the resolver from among signals detected from the resolver;
a velocity detector detecting a rotational velocity signal of the resolver from the angle signal detected at the angle detector;

an angle error estimator calculating a detection error for each frequency component by frequency analysis of the rotational velocity signal with reference to the detected angle signal and combining the calculated detection errors to generate an estimated angle error signal; and an angle signal correction circuit correcting a detected angle signal by using the generated estimated angle error signal;

wherein the angle error estimator comprises:

a high pass filter portion passing high frequency components of the rotational velocity signal, an m-part angle velocity data preparation portion dividing the high frequency components of the rotational velocity signal passed through the high pass filter portion to a plurality of regions with reference to the detected angle signal, a Fourier transform portion applying a Fourier transform to the m-part angle velocity data generated at the m-part angle velocity data preparation portion, an n-th order coefficient accumulation portion accumulating Fourier transform coefficients of the n-th order components for results of the Fourier transform at the Fourier transform portion to calculate n-th order coefficient accumulation value signals, and an m-part error angle data preparation portion combining the n-th order coefficient accumulation value signals calculated at the n-th order coefficient accumulation portion to prepare the estimated angle error signal.

2. An angle detection device of a resolver as set forth in claim 1, wherein the n-th order coefficient accumulation portion multiplies a gain smaller than the Fourier transform coefficient with the Fourier transform coefficient of each order component and accumulates the multiplied values to calculate the n-th order coefficient accumulation value signals.

3. An angle detection method of a resolver comprising:

detecting an angle signal of the resolver from among signals detected from the resolver;

detecting a rotational velocity signal of the resolver from the detected angle signal;

calculating a detection error for each frequency component by a frequency analysis of the rotational velocity signal with reference to the detected angle signal and combining the calculated detection errors to generate an estimated angle error signal; and correcting an angle detection signal by using the generated estimated angle error signal;

wherein the calculating of the detection error includes:

passing high frequency components of the rotational velocity signals, dividing the high frequency components of the rotational velocity signals to a plurality of regions with reference to the detected angle signals, applying a Fourier transform to the m-part angle velocity data generated by the dividing, accumulating Fourier transform coefficients of the n-th order components for results of the Fourier transform to calculate n-th order coefficient accumulation value signals, and combining the n-th order coefficient accumulation value signals to prepare the estimated angle error signal.

4. A resolver apparatus comprising:

a resolver body having an SIN winding, a COS winding, and a rotor winding;

an excite voltage application portion applying excite voltages to the SIN winding and the COS winding or applying an excite voltage to the rotor winding; and an angle detector detecting an angle signal from among signals detected from the rotor winding or signals detected from the SIN winding and the COS winding;

a velocity detector detecting a rotational velocity signal of the resolver from among angle signals detected at the angle detector;

an angle error estimator calculating a detection error for each frequency component by frequency analysis of the velocity signal with reference to the detected angle signal and combining the calculated detection errors to generate an estimated angle error signal; and an angle signal correction circuit correcting a detected angle signal by using the generated estimated angle error signal;

wherein the angle error estimator includes:

a high pass filter portion passing high frequency components of the rotational velocity signal, an m-part angle velocity data preparation portion dividing the high frequency components of the rotational velocity signal passed through the high pass filter portion to a plurality of regions with reference to the detected angle signal, a Fourier transform portion applying a Fourier transform to the m-part angle velocity data generated at the m-part angle velocity data preparation portion, an n-th order coefficient accumulation portion accumulating Fourier transform coefficients of the n-th order components for results of the Fourier transform at the Fourier transform portion to calculate n-th order coefficient accumulation value signals, and an m-part error angle data preparation portion combining the n-th order coefficient accumulation value signals calculated at the n-th order coefficient accumulation portion to prepare the estimated angle error signal.

* * * * *